2,783,147
PROCESS FOR BREWING A SPECIAL BEER

Ingolf Felix Friedrich Emil Pauls, Basel, Switzerland, and Richard Rudolf Alfons Quatz, Gottingen, Germany No Drawing. Application February 10, 1953, Serial No. 336,192

Claims priority, application Switzerland February 13, 1952

3 Claims. (Cl. 99—38)

The invention relates to a process for the brewing of a special beer with a relative high percentage of alcohol and only a small percentage of extractive matter for diabetic people and people inclining to corpulence.

It is impossible to brew a beer suitable for diabetic people and people tending to corpulence, which is, without hesitation, recommended by doctors as a wholesome and salubrious beer, by any of the known ordinary brewing processes, for the only reason that brewers have so far not succeeded in attaining that high degree of fermentation which is necessary for the decomposition of the carbohydrates and the remaining extractive matter to such an extent that practically they can be considered as totally decomposed.

The invention aims at eliminating this deficiency of the various processes hitherto employed by introducing a process for the brewing of a beer with a relatively high percentage of alcohol and the least possible amount of extractive matter by which the sugar metabolism in people suffering from diabetes and corpulence is no longer influenced in any way detrimentally to their health.

The process proposed for solving this problem is characterized by the optimal temperature for the formation of maltose being already applied and kept up for a period longer than that in normal fermentation processes but of at least half an hour in the mashing process, the pH value of the finished beer thereby being adjusted at pH 4.2 and a first extract of diastase being added already before the commencement of the main fermentation and a second one at the close.

The invention further provides for another extract of diastase being added to the beer during the time of storing.

A further characterization of the invention consists in the storing beer being eventually racked off the spent beer yeast by pumping and the beer being newly stored up with a simultaneous addition of fresh yeast of a high fermenting value.

For the satisfactory working of the proposed process the following raw materials of a special property are required:

1. A highly kilned off malt poor in albumins, long and well developed in its growth that, owing to its high percentage of enzymes, easily yields its extract.
2. Hops of noble bitter principle and a high percentage of lupulin.
3. An especially highly fermenting pulverized yeast.
4. A specially prepared water, poor in carbonates and with only a small percentage of mineral salts.

The extract of diastase absolutely necessary for attaining a high degree of fermentation is obtained through the racking off the unsugared mash. Owing to its great fermenting strength this extract causes the almost complete decomposition of the various kinds of saccharates—otherwise so difficult to ferment by any of the normally employed methods of fermentation—both during the main and finishing fermentation.

*Examples*

1. Crushed Pilsen malt is treated in the customary manner by the double mashing process. The maltose forming temperature of 64° C. is applied from the start and maintained during the entire mashing procedure lasting at least one hour.

By a certain treatment of the used water and particularly its adjustment to the hardness suitable for the brewing process in question and by a biological acidifying of the mash the pH value of the wort is adjusted to 5.1 in order to make sure that the beer in its finished state will have the required pH equal to 4.2.

After mashing the wort is clarified, thereupon boiled and at the same time the hop is added. Thereupon the wort is cooled and the trub is separated. Prior to the main fermentation a first diastase extract and high fermenting fine yeast is added.

Upon conclusion of the main fermentation further diastase extract is added; the wort is filled into storage barrels as soon as the fresh beer has reached a fermentation of at least 90% of the apparent degree of fermentation. Upon storage the beer is filtered and run off.

2. The treatment is practically the same as above described; it differs only, as follows.

If the beer has not as yet reached the desired high degree of fermentation which renders it fit for final removal an additional diastase extract and fresh yeast is added and the beer is stored until it has reached the desired degree of fermentation for removal.

What we claim is:

1. A process of brewing beer having a high percentage of alcohol and a small amount of extractive matter which is suitable for consumption by diabetics and persons tending to corpulence comprising applying the maltose producing temperature of 64° C. from the start of the mashing to the wort, maintaining said mashing temperature for at least one hour, clarifying the wort, thereafter cooking the same and simultaneously adding hop, cooling the wort and separating the draff, thereafter adding a first portion of diastase extract and of a well fermenting yeast prior to the start of the main fermentation, adding a second portion of diastase extract at the completion of the main fermentation whereby a fermentation rate of the beer is attained equal to 90 percent.

2. A process of brewing beer having a high percentage of alcohol and a small amount of extractive matter which is suitable for its consumption by diabetics and persons tending to corpulence comprising applying the maltose producing temperature of 64° C. from the start of the mashing of the wort, maintaining said mashing temperature for at least one hour, clarifying the wort, thereafter cooking the same and simultaneously adding hop, cooling the wort and separating the draff, thereafter adding a first portion of diastase extract prior to the start of the main fermentation, adding a second portion of diastase extract at the completion of the main fermentation, storing the beer in a tank and adding a further amount of diastase extract and of fresh yeast to the beer during its storage.

3. A process of brewing beer having a high percentage of alcohol and a small amount of extractive matter which is suitable for its consumption by diabetics and persons tending to corpulence comprising applying the maltose producing temperature of 64° C. from the start of the mashing to the wort, maintaining said mashing temperature for at least one hour, clarifying the wort, thereafter cooking the same and simultaneously adding hop, cooling the wort and separating the draff, thereafter adding a first portion of diastase extract prior to the start of the main fermentation, adding a second portion of diastase extract at the completion of the main fermentation, storing the beer in a tank and adding a further amount of diastase extract to the beer which is kept on storage, pumping the same into a second storage tank and simultaneously adding fresh yeast of a high fermenting capacity to the stored beer.

References Cited in the file of this patent

UNITED STATES PATENTS

| | | |
|---|---|---|
| 1,099,746 | Heuser | June 9, 1914 |
| 1,297,013 | Schirmer | Mar. 11, 1919 |
| 2,146,240 | Thomas | Feb. 7, 1939 |

FOREIGN PATENTS

| | | |
|---|---|---|
| 647,851 | Germany | July 14, 1937 |